United States Patent [19]

Benton

[11] Patent Number: 4,685,589
[45] Date of Patent: Aug. 11, 1987

[54] COMPOSITE PRESSURE VESSEL INCLUDING A FLUID PORT DIRECTLY THROUGH THE COMPOSITE SIDE WALL STRUCTURE

[75] Inventor: Terry L. Benton, Portage, Mich.

[73] Assignee: Pneumo Corporation, Boston, Mass.

[21] Appl. No.: 845,841

[22] Filed: Mar. 28, 1986

[51] Int. Cl.$^4$ .............................................. F16L 9/00
[52] U.S. Cl. ...................................... 220/465; 220/3; 220/414
[58] Field of Search .................. 220/465, 453, 414, 3, 220/5 A

[56] References Cited

U.S. PATENT DOCUMENTS

| | | | |
|---|---|---|---|
| 2,988,240 | 6/1961 | Hardesty | 220/414 X |
| 3,057,509 | 10/1962 | Bernd | 220/465 X |
| 3,312,575 | 4/1967 | Corbin, Jr. | 220/3 X |
| 3,508,677 | 4/1970 | Laibson et al. | 220/3 |
| 3,589,403 | 6/1971 | Chase | 220/465 X |

Primary Examiner—Steven M. Pollard
Attorney, Agent, or Firm—Renner, Otto, Boisselle & Lyon

[57] ABSTRACT

A composite pressure vessel including a fluid port directly through the composite side wall structure formed by internally locating a porting fitting in the side wall structure and then inserting a liner member in the interior of the side wall structure. When thus assembled, a void space is provided between a flange portion on the radial inner end of the porting fitting and the liner member which is completely filled with a sealant. Then a porting hole is drilled through the sealant and liner member from the exterior fitting end. A nut may be threaded onto an exteriorly protruding end portion of the porting fitting and torqued to preload the porting fitting against the composite side wall structure. Also, composite material reinforcement may be applied locally around the protruding end portion (and nut).

9 Claims, 4 Drawing Figures

COMPOSITE PRESSURE VESSEL INCLUDING A FLUID PORT DIRECTLY THROUGH THE COMPOSITE SIDE WALL STRUCTURE

BACKGROUND OF THE INVENTION

This invention relates generally as indicated to a composite pressure vessel including a fluid port, and more particularly to the provision of such fluid port directly through the composite side wall structure, and to the method of making such fluid port.

Pressure vessels such as used, for example, in fluid actuators for flight controls for aircraft may be constructed of fabric reinforced composite materials to reduce the weight of the vessels without sacrificing strength. Such composite pressure vessels have included impermeable inner barrier liner members to prevent fluid seepage through the relatively porous composite materials. These liner members have been fabricated from metals and organic materials, and may but need not be bonded to the inner wall of the pressure vessels.

Because of the permeability of such composite materials, and the necessary sealing liner when used to contain fluids under pressure, up to now it has been difficult to port fluid (including hydraulic fluids or gases) directly through the composite pressure vessel side wall, as is often desirable.

SUMMARY OF THE INVENTION

With the foregoing in mind, it is a principal object of this invention to provide a composite pressure vessel with novel fluid port and method of constructing same through the pressure vessel composite side wall structure.

Another object is to provide a potentially permanent seal between a porting fitting and a sealing liner of a composite pressure vessel which eliminates any potential leakage problems and allows for limited movement between the pressure vessel and sealing liner.

Still another object is to provide such a seal which does not normally require any servicing or replacement but is nevertheless replaceable if the sealing liner is replaced.

These and other objects of the present invention may be achieved by providing a porting fitting in the composite side wall structure of the pressure vessel which is internally located prior to insertion of the sealing liner in the pressure vessel. After the porting fitting has been located and the sealing liner inserted, a sealant is injected from the external end of the porting fitting, filling a void space provided between the inner end of the porting fitting and sealing liner to form a permanent seal therebetween. After the sealant has cured, a porting hole is drilled through the sealant and sealing liner from the external fitting end. A nut may be threaded onto the exteriorly protruding end portion of the porting fitting and torqued to preload the fitting against the layers of the composite side wall structure. Also, local composite material reinforcement may be added locally around the exteriorly protruding end of the porting fitting (and nut if used) to reinforce the composite material discontinuity around the porting fitting.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE PREFERRED EMBODIMENTS

Figure 1:
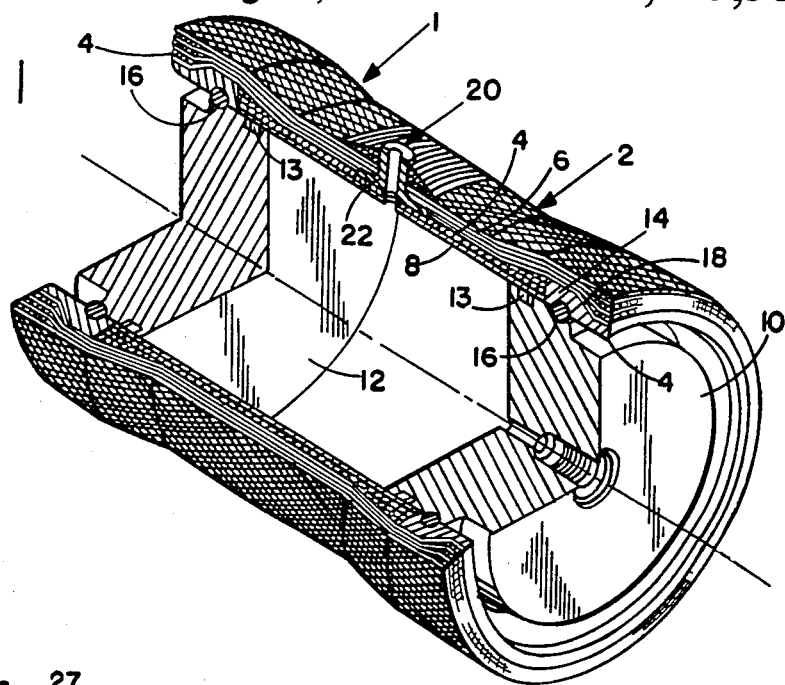
FIG. 1 is a schematic illustration of one form of composite pressure vessel, partly in section, to show a preferred form of fluid port in accordance with this invention directly through the composite side wall structure of the pressure vessel.

Referring now in detail to the drawings, and initially to FIG. 1, there is schematically shown a pressure vessel 1 including a side wall structure 2 made of fabric reinforced composite materials. Such a pressure vessel may be used, for example, in fluid actuators for flight controls for aircraft and other high pressure applications.

The pressure vessel side wall structure 2 desirably includes plural layers of circumferential or hoop stress windings 4 and longitudinal tension windings 6 made of a suitable composite fiber such as a high modulus graphite filament wound fiber impregnated with a suitable resin such as epoxy, polyester, polyimide, etc. The inner diameter (I.D.) of the vessel is shown lined with an impermeable inner barrier liner member 8 to prevent fluid seepage through the relatively porous composite material of the pressure vessel side wall 2. Such liner member may be fabricated from metal or organic materials, and may or may not be bonded to the I.D. of the side wall as desired.

At opposite ends of the pressure vessel side wall are separately formed end walls, 10, 12. As shown, the opposite ends of the liner member 8 and hoop and longitudinal windings 4 and 6 surrounding same extend axially beyond the inner ends of the end walls, with suitable seals 13 disposed between the end walls and liner member to prevent fluid leakage therepast. The opposite ends of the longitudinal tension windings 6 may be secured to the end walls 10, 12 by means of separate ring retainers 14 connected to the respective end walls in any suitable manner, for example, by threaded connections or by means of retaining wires 16 as shown. Such annular ring retainers 14 extend radially outwardly beyond the adjacent ends of the liner member 8 and desirably have external tapered ramp surfaces 18 facing in opposite directions away from each other for clamping engagement of the ends of the longitudinal tension windings 6 thereto as by means of additional circumferential hoop stress windings 4 interspersed between the longitudinal tension windings 6 radially outwardly of the ramp surfaces 18.

Heretofore, it has been difficult to port fluid (either hydraulic fluids or gases) directly through the pressure vessel side wall 2 because of the permeability of the composite windings 4, 6 and the necessary sealing liner 8. However, the present invention has made such porting relatively simple and easy as described hereafter.

Figure 2:
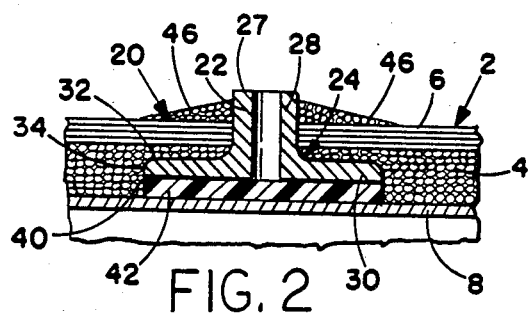
FIG. 2 is an enlarged fragmentary longitudinal section through a partially completed fluid port and surrounding pressure vessel composite side wall structure as seen during an intermediate step in the formation of the fluid port of FIG. 1.
Figure 4:
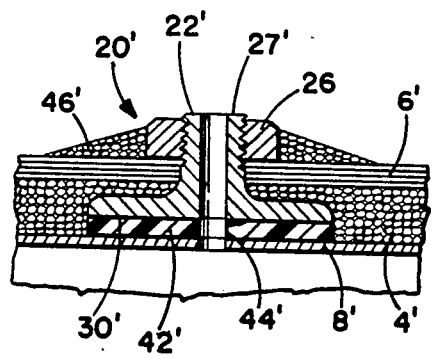
FIG. 4 is an enlarged fragmentary longitudinal section through another form of fluid port and surrounding pressure vessel composite side wall structure in accordance with this invention.
Figure 3:
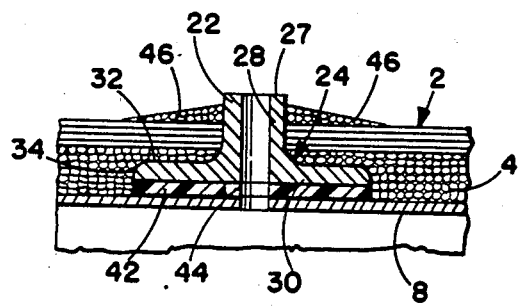
FIG. 3 is an enlarged fragmentary longitudinal section through the completed fluid port and surrounding pressure vessel composite side wall structure of FIG. 1.

Referring further to FIG. 1, and also to FIGS. 2 and 3, there is shown a preferred form of fluid port 20 in accordance with this invention which includes a porting fitting 22 internally located in the pressure vessel side wall 2. If desired, such porting fitting may be located on a mandrel and would in place during winding of the circumferential hoop stress and longitudinal tension windings 4, 6. Alternatively, such porting fitting may be inserted into a countersunk cavity 24 produced by a secondary machining operation after the side wall structure 2 has been wound and the resulting assembly has been removed from the mandrel and cured as by placing the assembly in an oven and heating same to a temperature sufficient to cause the windings to bond together. Also, if desired, a nut 26 may be threaded onto the exteriorly protruding end portion 27' of the fitting 22' and torqued to preload the fitting against the layers of composite windings 4', 6' as shown in FIG. 4. Otherwise, the details and manner of construction of the fluid port 20' shown in FIG. 4 are substantially the same as that shown in FIGS. 1—3, and accordingly the same reference numerals followed by a prime (') symbol are used to designate like parts.

Preferably, the porting fitting 22 includes a tubular portion 28 extending radially outwardly of the exterior of the pressure vessel side wall 2 and a flange portion 30 at the inner end thereof received in an enlarged portion 32 of the cavity 24 which opens to the I.D. of the side wall 2. The enlarged cavity portion 32 includes a side wall 34 substantially corresponding in size and shape to the outer annular periphery of the fitting flange 30. However, the depth of the enlarged cavity portion 32 is greater than the thickness of the flange 30, for example, twice the thickness, so that when the flange 30 is seated up against the bottom of the enlarged cavity portion as shown in FIGS. 2 and 3, there is a void space 40 between the bottom of the flange and the I.D. of the side wall 2 for a purpose to be subsequently described.

After the porting fitting 22 has been internally located in the composite side wall 2 in the manner previously described, the liner member 8 is inserted into the pressure vessel and bonded thereto or not as desired. Then a suitable sealant is injected through the porting fitting 22 from the external end thereof, completely filling the void space 40 between the bottom of the fitting flange 30 and O.D. of the sealing liner 8 to form a seal 42 therebetween as shown in FIG. 2. After the sealant has cured, a porting hole 44 may be drilled through the seal material 42 and sealing liner 8 from the external fitting end as shown in FIG. 3. Finally, local composite reinforcement material 46 may be added locally around the protruding end 27 of the porting fitting 22 (and nut 26 if used as shown in FIG. 4) to reinforce the composite material discontinuity as further shown in the drawings. The end walls 10, 12 are then inserted into the ends of the side wall 2 and secured in place in the manner previously described.

As will be apparent, the use of such a seal 42 between the porting fitting flange 30 and liner member 8 and surrounding composite windings 4 and/or 6 provides a potentially permanent seal therebetween which eliminates any potential leakage problems. The material of the seal 42 should of course be sufficiently elastic to allow for limited movement between the composite wall structure 2 and the liner member 8, which is to be expected. When the seal 42 is made in the manner described, no special shaped seal is required to conform to the sealing liner, which could potentially be a leakage problem and require frequent unit servicing for seal replacement. Such a seal does not normally require any servicing or replacement. However, it should be understood that the seal 42 is nevertheless replaceable if the sealing liner 8 is replaced.

Although the invention has been shown and described with respect to certain preferred embodiments, it is obvious that equivalent alternations and modifications will occur to others skilled in the art upon the reading and understanding of the specification. The present invention includes all such equivalent alterations and modifications, and is limited only by the scope of the claims.

What is claimed is:

1. A composite pressure vessel comprising a side wall structure of composite material, a liner member lining the interior of said side wall structure, and a fluid port through said side wall structure and liner member, said fluid port comprising a porting fitting internally located in said side wall structure, said porting fitting including a tubular portion extending radially through said side wall structure from the exterior of said side wall structure toward the interior thereof, and a flange portion at the radial inner end of said tubular portion, said flange portion being located within said side wall structure radially outwardly spaced from said liner member to provide a void space between said flange portion and said liner member, and seal means completely filling said void space between said flange portion and liner member except for a porting hole extending through said seal means, porting fitting and liner member.

2. The composite pressure vessel of claim 1 wherein said flange portion is received in a cavity in the inner wall of said side wall structure, said seal means completely filling the portion of said cavity between said flange portion and liner member except for said porting hole extending therethrough.

3. The composite pressure vessel of claim 2 wherein said flange portion is seated up against the radial outer wall of said cavity.

4. The composite pressure vessel of claim 3 wherein said cavity has a side wall which substantially corresponds in size and shape to the outer periphery of said flange portion.

5. The composite pressure vessel of claim 3 wherein the radial depth of said cavity is approximately twice the thickness of said flange portion.

6. The composite pressure vessel of claim 1 wherein said composite side wall structure consists of a plurality of layers of longitudinal and hoop stress windings surrounding said porting fitting and liner member.

7. The composite pressure vessel of claim 1 wherein said tubular portion of said porting fitting has a protruding end portion extending radially outwardly beyond the exterior of said side wall structure, and local composite reinforcement material surrounds said protruding end portion.

8. The composite pressure vessel of claim 1 wherein said tubular portion of said porting fitting has a protruding end portion extending radially outwardly beyond the exterior of said side wall structure, and nut means are threaded onto said exteriorly protruding end portion, said nut means being torqued to preload said porting fitting against the composite material of said side wall structure.

9. The composite pressure vessel of claim 8 further comprising local composite reinforcement material surrounding said nut means and protruding end portion of said porting fitting.

* * * * *